(12) United States Patent
Saint-Etienne

(10) Patent No.: US 8,312,512 B2
(45) Date of Patent: Nov. 13, 2012

(54) SECURE FILE TRANSFER METHOD

(75) Inventor: Jean-Francois Saint-Etienne, Cugnaux (FR)

(73) Assignee: Airbus Operations SAS, Toulouse (FR)

( * ) Notice: Subject to any disclaimer, the term of this patent is extended or adjusted under 35 U.S.C. 154(b) by 1002 days.

(21) Appl. No.: 12/299,774

(22) PCT Filed: Apr. 27, 2007

(86) PCT No.: PCT/FR2007/051186
§ 371 (c)(1),
(2), (4) Date: Nov. 6, 2008

(87) PCT Pub. No.: WO2007/132107
PCT Pub. Date: Nov. 22, 2007

(65) Prior Publication Data
US 2009/0133101 A1 May 21, 2009

(30) Foreign Application Priority Data
May 17, 2006 (FR) ..................................... 06 51783

(51) Int. Cl.
*H04L 9/32* (2006.01)
(52) U.S. Cl. .............................. 726/3; 709/220; 455/431
(58) Field of Classification Search .......................... None
See application file for complete search history.

(56) References Cited

U.S. PATENT DOCUMENTS

| 6,760,778 B1 | 7/2004 | Nelson et al. |
| 2002/0080791 A1 | 6/2002 | Sylvain |
| 2003/0084219 A1* | 5/2003 | Yao et al. ...................... 710/300 |
| 2003/0182404 A1* | 9/2003 | Saint-Etienne et al. ...... 709/220 |
| 2004/0193732 A1 | 9/2004 | Nelson et al. |
| 2005/0026609 A1* | 2/2005 | Brinkley et al. .............. 455/431 |
| 2005/0047438 A1 | 3/2005 | Sylvain |
| 2005/0220029 A1 | 10/2005 | Calluaud et al. |
| 2005/0243836 A1* | 11/2005 | Truitt et al. .............. 370/395.52 |
| 2005/0267860 A1* | 12/2005 | Benguigui ........................ 707/1 |
| 2007/0130281 A1* | 6/2007 | Sandell et al. ................. 709/216 |

OTHER PUBLICATIONS

Hoyme, Kenneth et al., "ARINC 629 and SAFEbus*: Data Buses for Commercial Aircraft", Scientific Honeyweller, Honeyweller'S Corporate, vol. 11, No. 1, pp. 57-70, (1991).
"CES White Paper on AFDX (Avionics Full Duplex Switched Ethernet)", CES-Creative Electronics Systems S.A., pp. 1-20, (2003).
Sollins, K. R. "The TFTP Protocol (Revision 2)", Network Working Group Request for Comments: 783, pp. 1-16, (1981).
"ARINC Protocol Tutorial", Condor Engineering, Inc., Chapter 1 and 2, pp. i-ii and 1-23, (2000).

* cited by examiner

*Primary Examiner* — Fikremariam A Yalew
(74) *Attorney, Agent, or Firm* — Oblon, Spivak, McClelland, Maier & Neustadt, L.L.P.

(57) ABSTRACT

An on-board telecommunication system, partitioned into a secure area and a non secure area, including at least a first telecommunication equipment unit in the secure area, a second telecommunication equipment unit in the non secure area, and a first one-way link from the first to the second equipment. The first equipment unit is configured to transmit data on the first link according to a first protocol. The system further includes a second link from the second to the first equipment unit, in accordance with a second protocol, the first two layers of which are distinct of those of the first protocol, the second equipment configured to transmit data on the second link as messages in accordance with the first protocol and encapsulated in frames in accordance with the second protocol.

9 Claims, 3 Drawing Sheets

| 32 | 31 | 30 | 29 | | 11 | 10 | 9 | 8 | | 1 |
|---|---|---|---|---|---|---|---|---|---|---|
| P | SSM | | PAYLOAD | | | PAD | SDI | | LABEL | |

SECURE FILE TRANSFER METHOD

TECHNICAL FIELD

This invention relates to the field of on-board telecommunication systems, in particular on board an aircraft.

BACKGROUND OF THE INVENTION

Recently, some airlines have been offering to their passengers in-flight telecommunication services, in particular the possibility to access the internet and send/receive e-mail via a satellite link. For this purpose, the airplane cabin is equipped with a wired network of the Ethernet type or a WLAN network (IEEE 802.11b/g) into which passengers can log conventionally. The description of such a communication system can be found for instance in the international application WO00/14987.

Pilots, maintenance personnel, and flight personnel also have control terminals linked to the on-board network. It has been found necessary, for obvious security reasons, to partition the network into a non secure area and a secure area, with passengers being able to access the former but not the latter. The secure area comprises in particular the information and control systems of the airplane, located in the cockpit and the avionics bay. It is protected by conventional physical access control means.

One easy and known way of prohibiting access to a secure area of an on-board network is to provide for the links between the secure area and the non secure area to be one-way links.

FIG. 1 schematically illustrates an on-board network 100 partitioned into a secure area A and a non secure area B. Links 110 are one-way links from A to B, e.g. Ethernet links using single twisted pair wiring corresponding to the direction of communication from A to B. Although such a system efficiently warrants security of area A, it does however have two major drawbacks. First of all, it definitely prohibits any communication from area B to area A. Also, for data transfer from area A to area B, the destination equipment cannot return an acknowledgement to the equipment having sent the data. This is incompatible with most current communication protocols and moreover deprives the source equipment of any kind of guarantee regarding the correct transfer procedure.

It is the object of the present invention to propose an on-board telecommunication system, partitioned into a secure area and a non secure area, which offers possibilities of two-way communication between the two areas without substantially reducing protection of the secure area.

DISCLOSURE OF THE INVENTION

The present invention is defined by an on-board telecommunication system, partitioned into a secure area and a non secure area, comprising at least a first telecommunication equipment unit in the secure area, a second telecommunication equipment unit in the non secure area, and a first one-way link from the first to the second equipment units, said first equipment unit being adapted for transmitting data on said first link according to a first protocol. The system includes a second link from the second to the first equipment unit, in accordance with a second protocol the first layers of which are distinct from those of the first protocol, said second equipment unit being adapted for transmitting data on the second link as messages in accordance with the first protocol and encapsulated in frames in accordance with the second protocol.

Advantageously, the two first layers of the first protocol are Ethernet layers; e.g., the stack of the first protocol is TFTP/UDP/IP/Ethernet.

According to a first embodiment, the first two layers of the second protocol are ARINC 429 layers.

According to a second embodiment, the first two layers of the second protocol are CAN layers.

BRIEF DESCRIPTION OF THE DRAWINGS

Other characteristics and advantages of the invention will be apparent from reading a preferred embodiment of the invention with reference to the appended figures, wherein.

DETAILED DISCLOSURE OF SPECIFIC EMBODIMENTS

A first basic concept of the invention is to provide a return link from the non secure area to the secure area, compliant with a protocol (hereafter called second protocol), the first two layers of which are distinct from those of the protocol used for communication from the secure area to the non secure area (hereafter called first protocol).

A second basic concept of the invention is to use for data transmission a file transfer protocol that is simple and robust, with all control messages thereof coming from the secure area.

Figure 1:
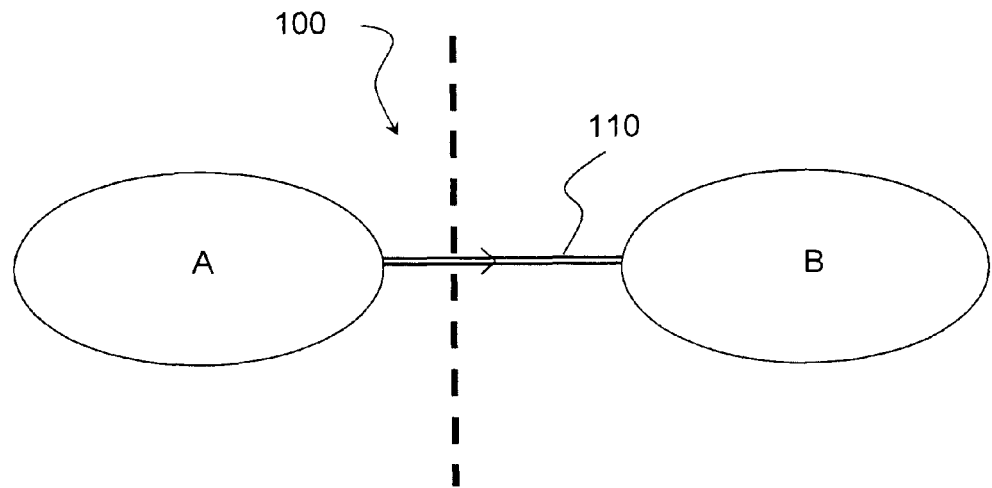
FIG. 1 schematically illustrates an on-board network known from the state of the art.
Figure 2:
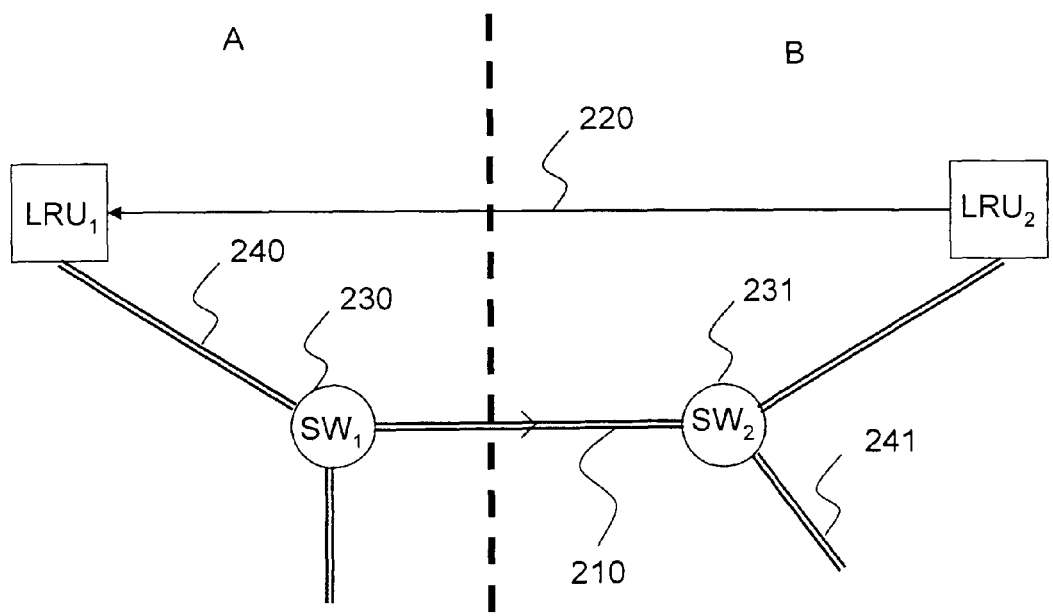
FIG. 2 schematically illustrates an on-board telecommunication system according to a first embodiment of the invention.

FIG. 2 schematically illustrates an on-board telecommunication system according to the invention.

$LRU_1$ and $LRU_2$ identify telecommunication equipments respectively belonging to the secure area A and the non secure area B. The sub-networks corresponding to the areas A and B are switched and/or shared Ethernet networks; e.g., the sub-network of area A can be an AFDX (Avionics Full Duplex Switched Ethernet) network, a description of which can be found in the document "CES White Paper on AFDX" available at the site www.ces.ch. The Ethernet links of the areas A and B, such as links 240 and 241, can be of full-duplex type. On the other hand, each Ethernet link going from area A to area B, such as link 210, is necessarily of the simplex type.

According to the invention, each link going from area B to area A, such as link 220, is compliant with a protocol distinct from that of links 210, e.g. the ARINC 429 protocol commonly used in the field of aeronautics. The ARINC 429 protocol standardizes the physical layer as well as the link layer. It uses a pair of twisted wires and a one-way transmission, herein chosen from B to A.

Alternatively, links going from area B to area A will be in accordance with the CAN (Control Area Network) protocol popular in the automobile field. The link layer and certain aspects of the physical layer of the CAN protocol are standardized in the standard ISO 11898-1. This protocol provides for transmission of the half-duplex type on a simple wire pair. Practically, in the present invention, only transmission from area B to area A will be used.

Figure 3:
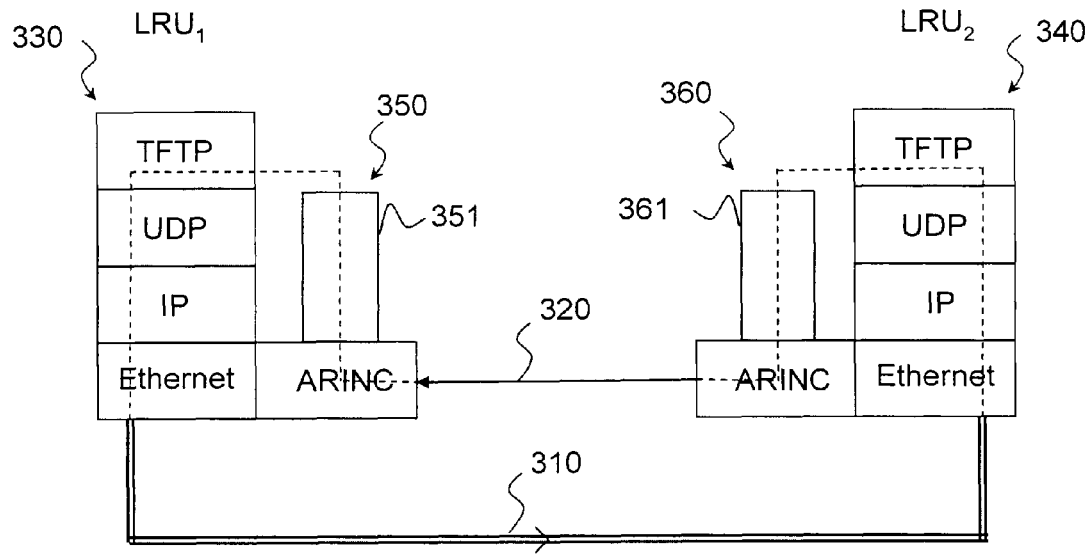
FIG. 3 illustrates the communications protocol between an equipment unit of the secure area and an equipment unit of the non secure area.

FIG. 3 represents the protocol stacks implemented in the telecommunication system according to an embodiment of the invention. The $LRU_1$ equipment uses a first protocol stack 330 for transmitting on the one-way Ethernet link 310 and a second protocol stack 350 for receiving data on the return link, herein a link 320 compliant with the ARINC 429 protocol. Symmetrically, the $LRU_2$ equipment uses a first protocol stack 340 for receiving data on the Ethernet link 310 and a second protocol stack 360 for transmitting data on link 320.

Advantageously, the first protocol stacks 330 and 340 are composed of TFTP/UDP/IP/Ethernet. It should be remembered that TFTP (Trivial File Transfer Protocol) is a file transfer protocol, standardized by IETF. A comprehensive description can be found in RFC 1350 under www.ietf.org/rfc/rfc783.txt.

When the $LRU_1$ equipment wants to transmit a data file to $LRU_2$, the TFTP layer opens a temporary session by means of a write request (WRQ) and splits the file into blocks of 512 bytes. The blocks are transmitted to the UDP transport layer after concatenation with a TFTP header. The UDP layer provides a message level service, without connection or restart on error, known by the one skilled in the art. The IP datagrams of the message are then transmitted conventionally in Ethernet frames. Upon receipt, the data pass in the other direction of the protocol stack 340. For each TFTP message received, the $LRU_2$ equipment transmits an acknowledge message, in accordance with the RFC 1350 standard, this message being encapsulated in ARINC 429 frames, as indicated at 360 and detailed below. The ARINC frames are transmitted conventionally on link 320 and the message is decapsulated at 351. Thus, for the TFTP layer of the stacks 330 and 340, everything happens as if the transport were taking place on an IP network by means of full-duplex links.

When the $LRU_2$ equipment has to transmit a data file to $LRU_1$, a temporary session is opened on the initiative of $LRU_1$ by means of a read request (RRQ). The file to be transmitted is split into blocks of 512 bytes by the TFTP layer of the stack 340, and the blocks are concatenated with the corresponding TFTP header. The TFTP messages thus obtained are encapsulated in ARINC frames, as indicated in 361 and detailed below. The ARINC frames are transmitted conventionally on link 320 and decapsulated at 351. The $LRU_1$ equipment then transmits an acknowledge message via stack 330, the Ethernet simplex link 310. The acknowledge message is routed in the other direction through the protocol stack 340. Here again, for the TFTP layer of stacks 330 and 340, everything happens as if the transport were taking place on an IP network by means of full-duplex links.

The ARINC link 320 and the mechanism for encapsulating messages of the first protocol into frames of the second protocol form an access barrier to the secure area.

The $LRU_2$ equipment of the non secure area is permanently installed in the aircraft, e.g. as a proxy server to which the passenger terminals can be connected. In this case, the conversion gateway, which realizes TFTP message encapsulation, is located in said server.

Figure 4:
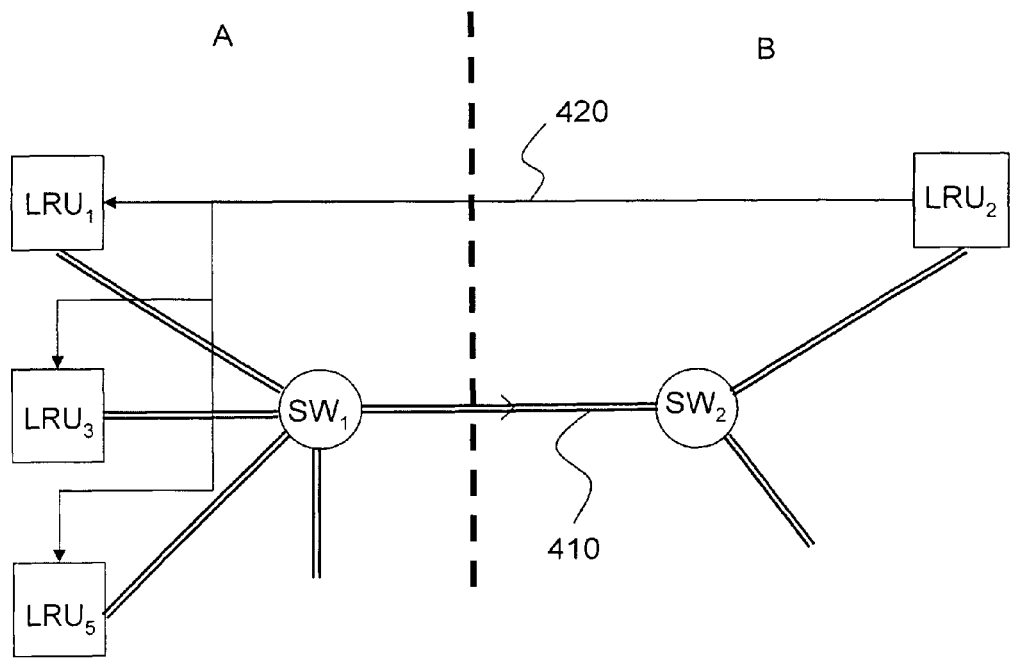
FIG. 4 schematically illustrates an on-board telecommunication system according to a second embodiment of the invention.

FIG. 4 schematically illustrates an on-board telecommunication system according to a second embodiment of the invention. Unlike the first embodiment, several equipment units of the secure area $LRU_1$, $LRU_3$, $LRU_5$ can communicate with an equipment unit $LRU_2$ of the non secure area. For this purpose, an ARINC link 420 of the multicast type serves as a return path to the equipment involved. It should be remembered that an ARINC link cannot be connected to an emitter, but can serve up to twenty receivers.

Figures 5, 6:
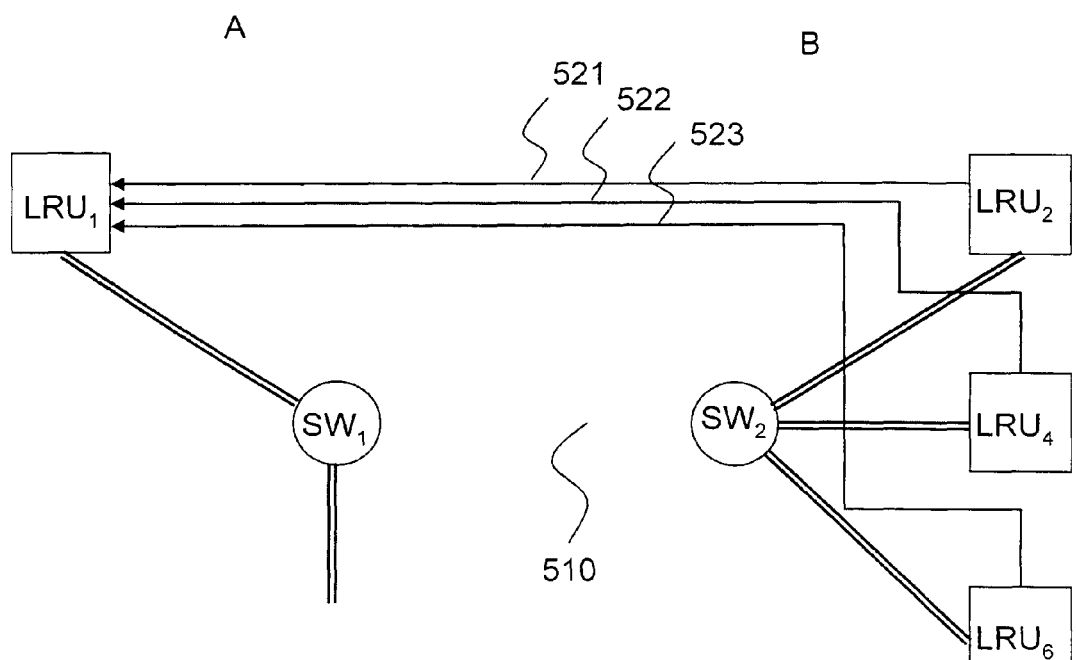
FIG. 5 schematically illustrates an on-board telecommunication system according to a third embodiment of the invention.
FIG. 6 represents a frame used on a link compliant with the ARINC 429 protocol.

FIG. 5 schematically illustrates an on-board telecommunication system according to a third embodiment of the invention. Unlike the first and second embodiments, an equipment unit of the secure area, such as $LRU_1$, can here communicate with a plurality of equipment units of the non secure area $LRU_2$, $LRU_4$, $LRU_6$. For this purpose, the $LRU_1$ equipment has a plurality of ARINC 429 interfaces. A plurality of de ARINC links 521, 522, 523 respectively connecting the equipment units $LRU_2$, $LRU_4$, $LRU_6$ to said interfaces serve as return paths. In this embodiment, a CAN bus can be used advantageously instead of ARINC links, as a CAN bus can be linked to a plurality of emitters.

It is clear for one skilled in the art that the second and third embodiments can advantageously be combined into a fourth embodiment in order to enable a plurality of equipment units of the secure area to communicate with a plurality of equipment units of the non secure area. In this case, several ARINC links of the multicast type serve as return paths to the equipment units of the secure area. According to a variant, a CAN bus ensures the return function between the equipment units of the non secure area and those of the secure area.

The embodiments envisaged above make use of a mechanism for encapsulating TFTP messages in frames of the second protocol, e.g. ARINC 429. A detailed description of the ARINC 429 protocol can be found in the article entitled "ARINC Protocol Tutorial" available at the site www.condoreng.com.

FIG. 6 schematically represents an ARINC frame. It is composed of a 32-bit word comprising five fields. The P bit is a parity bit. The SSM field indicates the operating status of the equipment. The PAYLOAD field of 19 bits contains the payload, if required stuffed with padding bits (PAD). The SDI field allows for the destination of the frame to be identified in case of a multicast transmission. Finally, the LABEL field indicates the avionics parameter corresponding to the payload and the format of the data composing it.

Hereafter, the TFTP messages will be considered, which can be transmitted after encapsulation on the return path, namely ACK, DATA, ERROR.

With reference to FIG. 3, when the $LRU_1$ equipment wants to transmit a data file to the $LRU_2$ equipment, it transmits a write request message (WRQ) thereto. If $LRU_2$ is ready to receive the file, it returns to $LRU_1$ an acknowledge message. Then, for each message received containing a data block of the file, the $LRU_2$ equipment returns to $LRU_1$ an acknowledge message indicating the number of the block received. The end of the file is detected by the TFTP layer of the stack 340, when it receives a block of less than 512 bytes. The first message for acknowledging the write request conventionally indicates block number 0. When the $LRU_1$ equipment transmits a data block, the TFTP layer of the stack 330 sets a timer. If an acknowledge message is not received before the end of timing, the data block is transmitted again by means of a TFTP message.

The acknowledge message ACK of the TFTP protocol includes a first Opcode field of two bytes identifying the type of message (Opcode=4) and a second field of two bytes giving the number of the block the receipt of which is acknowledged. The encapsulation module 361 stores in a frame of the second protocol the second Opcode byte (the first byte always being zero for an acknowledge message), then the two block number bytes. It concatenates with this message the UDP port numbers of the source ($LRU_1$) and destination ($LRU_2$) equipment used for data transfer. With each UDP port number being coded by one byte, 7 bytes must be transmitted for an acknowledge message, requiring 3 ARINC frames or a single CAN frame.

When the $LRU_1$ equipment wishes to receive a data file from the $LRU_2$ equipment, it transmits thereto a read request RRQ. If the latter is ready for transmitting, it directly transmits thereto as an acknowledgement the first block of 512 bytes of the file involved. The $LRU_1$ equipment transmits in return an acknowledge message ACK of the first block. The process continues as before until transmission of the last block of the file. If the TFTP layer of the stack 340 does not receive an acknowledgement in a given time after the transmission of a block, it repeats the transmission thereof.

A data message, DATA, of the TFTP protocol comprises a first Opcode field of two bytes identifying the type of message (Opcode=3), a second field of two bytes giving the number of the block transmitted and a field of n bytes with $0 \leq n \leq 512$, wherein the data block is stored.

The encapsulation module 361 stores in a frame of the second protocol the second Opcode byte (the first byte is always zero for a data message), then the two number bytes of the block transmitted, and finally the n bytes of the block involved. The module 361 concatenates with this message the numbers of the UDP ports of the source ($LRU_1$) and destination ($LRU_2$) equipment used for data transfer. Thus, for the transmission of a block of n data bytes, n+7 bytes must be transmitted requiring $E[(n+7).8/19]+1$ ARINC frames, where $E[x]$ gives the integer part of x, and n+7 CAN frames.

If a write request (WRQ) or a read request (RRQ) transmitted by $LRU_1$ cannot be granted by $LRU_2$, or if an error occurs during data transfer, an error message is transmitted by the TFTP layer of the stack 340.

The error message, ERROR, of the TFTP protocol includes a first Opcode field of two bytes identifying the type of message (Opcode=5), a second field of two bytes containing the code of the error diagnosed, and possibly a third field containing an ASCII string describing the error, followed by a zero byte. This third field will not be used herein.

The encapsulation module 361 stores in a frame of the second protocol the second Opcode byte (the first byte is always zero for an error message), then the two bytes of the error code. The module 361 finally concatenates with this message the UDP port numbers of the source ($LRU_1$) and destination ($LRU_2$) equipment used for data transfer. Thus, for the transmission of an error message, 5 bytes have to be transmitted requiring 3 ARINC frames or 5 CAN frames.

When the $LRU_2$ equipment is linked to a plurality of equipment units of the secure area, as in the second embodiment, the encapsulation module 361 determines the value of the SID field of the ARINC frame depending on the destination of the TFTP message.

However, if the system uses a second protocol not allowing the destinations of a TFTP message to be distinguished, the module 361 will advantageously concatenate with the encapsulated message the IP address of the destination equipment.

Also, if a plurality of equipment units of the non secure area is linked to an equipment unit of the secure area, as in the third embodiment, and if the system uses a second protocol not allowing a destination equipment unit of a TFTP message to determine the source equipment which transmitted it, each module 361 will advantageously concatenate with the encapsulated message the IP address of the source equipment.

In general, in the case of the fourth embodiment, each module 361 will concatenate with the encapsulated message the respective IP addresses of the source and destination equipment of the TFTP message.

The invention claimed is:

1. An on-board telecommunication system, partitioned into a secure area and a non secure area, comprising:
    a first telecommunication equipment unit in the secure area;
    a second telecommunication equipment unit in the non secure area;
    a first one-way link from the first equipment unit to the second equipment unit, the first equipment unit configured to transmit data on the first link according to a first protocol;
    a second link from the second equipment unit to the first equipment unit, the second equipment unit configured to transmit data on the second link in accordance with a second protocol, the physical layer and data link layer of which are distinct from those of the first protocol,
    the second equipment unit configured to transmit data on the second link as messages in accordance with the first protocol and encapsulated in frames in accordance with the second protocol.

2. The on-board telecommunication system according to claim 1, wherein a physical layer and data link layer of the first protocol are Ethernet layers.

3. The on-board telecommunication system according to claim 2, wherein a stack of the first protocol is TFTP/UDP/IP/Ethernet.

4. The on-board telecommunication system according to claim 1, wherein the physical layer and data link layer of the second protocol are ARINC 429 layers.

5. The on-board telecommunication system according to claim 1, wherein the physical layer and data link layer of the second protocol are CAN layers.

6. An on-board telecommunication system, partitioned into a secure area and a non secure area, comprising:
    a first telecommunication equipment unit in the secure area;
    a second telecommunication equipment unit in the non secure area;
    a first one-way link from the first equipment unit to the second equipment unit, the first equipment unit configured to transmit data on the first link according to a first protocol;
    a second link from the second equipment unit to the first equipment unit, the second equipment unit configured to transmit data on the second link in accordance with a second protocol, the physical layer and data link layer of which are distinct from those of the first protocol,
    the second equipment unit configured to transmit data on the second link as messages in accordance with the first protocol and encapsulated in frames in accordance with the second protocol,
    wherein a stack of the first protocol is TFTP/UDP/IP/Ethernet, and
    the second equipment unit includes an encapsulation module configured to encapsulate a message of TFTP protocol, including ACK, ERROR, DATA, in ARINC 429 frames.

7. The on-board telecommunication system according to claim 6, wherein the encapsulation module is configured to concatenate with the TFTP message UDP ports used for transferring data between the first and second equipment units.

8. The on-board telecommunication system according to claim 6, wherein the encapsulation module is configured to concatenate with the TFTP message an IP address of the destination equipment of the TFTP message and/or an IP address of source equipment of the message.

9. An aircraft comprising:
    an on-board telecommunication system according to claim 1.

* * * * *